United States Patent
Engle et al.

(10) Patent No.: US 6,521,325 B1
(45) Date of Patent: Feb. 18, 2003

(54) OPTICALLY TRANSMISSIVE MICROEMBOSSED RECEPTOR MEDIA

(75) Inventors: Lori P. Engle, Little Canada, MN (US); Robert T. Fehr, St. Paul, MN (US); Patrick R. Fleming, Lake Elmo, MN (US); Alan G. Miller, Austin, TX (US); Todd R. Williams, Lake Elmo, MN (US); Caroline M. Ylitalo, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 122 days.

(21) Appl. No.: 09/583,294

(22) Filed: May 31, 2000

Related U.S. Application Data

(63) Continuation-in-part of application No. 09/324,094, filed on Jun. 1, 1999, now abandoned.

(51) Int. Cl.[7] .................................................. B32B 3/00
(52) U.S. Cl. ...................... 428/195; 428/205; 428/207; 428/211; 428/212; 428/213; 428/500
(58) Field of Search ................................ 428/195, 205, 428/207, 213, 500, 211, 212

(56) References Cited

U.S. PATENT DOCUMENTS

| | | |
|---|---|---|
| 3,706,276 A | 12/1972 | Yamada et al. |
| 3,957,724 A | 5/1976 | Schurb et al. |
| 3,997,702 A | 12/1976 | Schurb et al. |
| 4,145,112 A | 3/1979 | Crone et al. |
| 4,313,988 A | 2/1982 | Koshar |
| 4,379,804 A | 4/1983 | Eisele et al. |
| 4,500,631 A | 2/1985 | Sakamoto et al. |
| 4,567,073 A | 1/1986 | Larson et al. |
| 4,576,850 A | 3/1986 | Martens |
| 4,582,885 A | 4/1986 | Barber |
| 4,588,258 A | 5/1986 | Hoopman |
| 4,605,592 A | 8/1986 | Paquette et al. |
| 4,614,667 A | 9/1986 | Larson et al. |
| 4,649,064 A | 3/1987 | Jones |
| 4,751,127 A | 6/1988 | Pinkston et al. |
| 4,861,644 A | 8/1989 | Young et al. |
| 4,903,041 A | 2/1990 | Light |
| 4,904,519 A | 2/1990 | Newman |
| 4,935,307 A | 6/1990 | Iqbal et al. |
| 5,002,825 A | 3/1991 | Mimura et al. |
| 5,023,129 A | 6/1991 | Morganti et al. |
| 5,045,386 A | 9/1991 | Stan et al. |
| 5,084,338 A | 1/1992 | Light |
| 5,138,488 A | 8/1992 | Szczech |
| 5,141,790 A | 8/1992 | Calhoun et al. |
| 5,141,797 A | 8/1992 | Wheeler |
| 5,175,030 A | 12/1992 | Lu et al. |
| 5,183,597 A | 2/1993 | Lu |
| 5,192,548 A | 3/1993 | Valasquez et al. |
| 5,202,190 A | 4/1993 | Kantner et al. |
| 5,208,092 A | 5/1993 | Iqbal |
| 5,212,008 A | 5/1993 | Malhotra et al. |
| 5,213,873 A | 5/1993 | Yasuda et al. |
| 5,219,462 A | 6/1993 | Bruxvoort et al. |
| 5,229,207 A | 7/1993 | Paquette et al. |
| 5,271,765 A | 12/1993 | Ma |
| 5,290,615 A | 3/1994 | Tushaus et al. |
| 5,302,437 A | 4/1994 | Idei et al. |
| 5,304,223 A | 4/1994 | Pieper et al. |
| 5,342,688 A | 8/1994 | Kitchin et al. |
| 5,344,681 A | 9/1994 | Calhoun et al. |
| 5,354,813 A | 10/1994 | Farooq et al. |
| 5,378,638 A | 1/1995 | Deeg et al. |
| 5,437,754 A | 8/1995 | Calhoun |
| 5,449,540 A | 9/1995 | Calhoun et al. |
| 5,450,235 A | 9/1995 | Smith et al. |
| 5,534,386 A | 7/1996 | Petersen et al. |
| 5,589,269 A | 12/1996 | Ali et al. |
| 5,601,928 A | 2/1997 | Katayama et al. |
| 5,605,750 A | 2/1997 | Romano et al. |
| 5,647,935 A | 7/1997 | Hoshino et al. |
| 5,658,802 A | 8/1997 | Hayes |
| 5,670,226 A * | 9/1997 | Yoshizawa et al. ........ 428/40.1 |
| 5,712,027 A | 1/1998 | Ali et al. |
| 5,747,148 A | 5/1998 | Warner et al. |
| 5,753,350 A | 5/1998 | Bright |
| 5,756,183 A | 5/1998 | Kutsch et al. |
| 5,965,243 A | 10/1999 | Butler et al. |
| 5,989,685 A * | 11/1999 | Hockaday .................... 428/195 |
| 6,113,679 A * | 9/2000 | Adkins et al. ............. 106/31.6 |

FOREIGN PATENT DOCUMENTS

| | | | |
|---|---|---|---|
| DE | 26 51 427 A1 | 5/1978 | |
| EP | 0 544 283 A1 | 6/1993 | |
| EP | 0 570 515 B1 | 11/1993 | |
| EP | 0 832 756 A2 | 4/1998 | |
| GB | 2165164 * | 4/1986 | ............ B05D/1/36 |
| JP | 61-141585 | 6/1986 | |

(List continued on next page.)

OTHER PUBLICATIONS

"DNA Chips Come of Age"—Chem. & Eng. News pp. 42–43 Dec. 9, 1996.
Lemmo et al., "Characterization of an Inkjet Chemical Microdispenser for Combinatorial Library Synthesis", Anal. Chem. 1997, vol. 69, No. 4, Feb. 15, 1997, pp. 543–551.

(List continued on next page.)

Primary Examiner—Deborah Jones
Assistant Examiner—Ling Xu
(74) Attorney, Agent, or Firm—Scott A. Bardell

(57) ABSTRACT

A receptor medium with a sheet having an optically transmissive microembossed imaging surface as one major surface thereof. The receptor medium can receive jettable materials, which include inks, adhesives, biological fluids, chemical assay reagents, particulate dispersions, waxes, and combinations thereof. The microembossed medium unexpectedly solves such common inkjet printing problems as feathering, banding, and mudcracking in inkjet printing systems by controlling how an inkjet drop contacts and dries on an inkjet receptor medium and also Moire' effects but also provides sufficient optical transmissivity to be useful as overhead transparency media, backlit signage, and the like. Clear lines of demarcation between adjoining colors of a pigmented inkjet image graphic can be obtained without creation of the Moire' effects. Methods of making and using the inkjet receptor medium are also disclosed.

22 Claims, 4 Drawing Sheets

FOREIGN PATENT DOCUMENTS

| | | |
|---|---|---|
| JP | 07089217 | 4/1995 |
| JP | 08002096 | 1/1996 |
| JP | 90-86034 | 3/1997 |
| JP | 9127327 A | 5/1997 |
| JP | 9175004 A | 7/1997 |
| JP | 11 157204 | 6/1999 |
| WO | WO 92/07723 | 5/1992 |
| WO | WO 92/07899 | 5/1992 |
| WO | WO 92/13924 | 8/1992 |
| WO | WO 95/11464 | 4/1995 |
| WO | WO 96/33839 | 10/1996 |
| WO | WO 97/17207 | 5/1997 |
| WO | WO 97/18950 | 5/1997 |
| WO | WO 97/33758 | 9/1997 |
| WO | WO 98/29516 | 7/1998 |
| WO | WO 00/73082 | 10/1998 |
| WO | WO 98/45054 | 10/1998 |
| WO | WO 98/52746 | 11/1998 |
| WO | WO 99/03685 | 1/1999 |
| WO | WO 99/07558 | 2/1999 |
| WO | WO 99/17630 | 4/1999 |
| WO | WO 99/39914 | 8/1999 |
| WO | WO 99/55537 | 11/1999 |
| WO | WO 99/65999 | 12/1999 |

* cited by examiner

OPTICALLY TRANSMISSIVE MICROEMBOSSED RECEPTOR MEDIA

CROSS REFERENCE TO RELATED APPLICATION

This application is a Continuation-In-Part of U.S. patent application Ser. No. 09/324,094, filed Jun. 1, 1999, now abandoned which is incorporated herein by reference.

FIELD OF THE INVENTION

This application relates to inkjet printing media to improve effective drying times of the inkjet ink, improve abrasion resistance of the inkjet image after drying, and prevent visual defects caused by ink beading, ink spreading, or mudcracking, resulting in improved print quality. More specifically, this application relates to microembossed transparent ink jet receptor films which are suitable for use with desktop ink jet printers for the production of presentation quality overhead transparencies. Moreover, this application relates to managing the coalescence of ink within cavities of a microembossed receptor media.

BACKGROUND OF THE INVENTION

Image graphics are omnipresent in modern life. Images and data that warn, educate, entertain, advertise, etc. are applied on a variety of interior and exterior, vertical and horizontal surfaces. Non-limiting examples of image graphics range from advertisements on walls or sides of trucks, to posters that advertise the arrival of a new movie, warning signs near the edges of stairways, and the like.

The use of thermal and piezo inkjet inks has greatly increased in recent years with accelerated development of inexpensive and efficient inkjet printers, ink delivery systems, and the like.

Thermal inkjet hardware is commercially available from a number of multinational companies, including without limitation, Hewlett-Packard Corporation of Palo Alto, Calif.; Corporation of San Diego, Calif.; Xerox Corporation of Rochester, N.Y.; ColorSpan Corporation of Eden Prairie, Minn.; and Mimaki Engineering Co., Ltd. of Tokyo, Japan. The number and variety of printers change rapidly as printer makers are constantly improving their products for consumers. Printers are made both in desk-top size and wide format size depending on the size of the finished image graphic desired. Non-limiting examples of popular commercial scale thermal inkjet printers are Encad Corporation's NOVAJET Pro printers and Hewlett-Packard Corporation's 650C, 750C, and 2500CP printers. Non-limiting examples of popular wide format thermal inkjet printers include Hewlett-Packard Corporation's DesignJet printers, where the 2500CP is preferred because it has 600×600 dots/inch (dpi) resolution with a drop size in the vicinity of about 20 picoliters (pL).

Minnesota Mining and Manufacturing Company, of St. Paul, Minn., markets Graphic Maker Inkjet software useful in converting digital images from the Internet, ClipArt, or Digital Camera sources into signals to thermal inkjet printers to print such image graphics.

Inkjet inks are also commercially available from a number of multinational companies, particularly Minnesota Mining and Manufacturing Company which markets its Series 8551; 8552; 8553; and 8554 pigmented inkjet inks. The use of four process colors: cyan, magenta, yellow, and black (generally abbreviated "CMYK") permit the formation of as many as 256 colors or more in the digital image.

Media for inkjet printers are also undergoing accelerated development. Because inkjet imaging techniques have become vastly popular in commercial and consumer applications, the ability to use a personal computer to print a color image on paper or other receptor media has extended from dye-based inks to pigment-based inks. The media must accommodate that change. Pigment-based inks provide more durable images because of the large size of colorant as compared to dye molecules.

Inkjet printers have come into general use for wide-format electronic printing for applications, such as engineering and architectural drawings. Because of the simplicity of operation and economy of inkjet printers, this image process holds a superior growth potential promise for the printing industry to produce wide format, image on demand, presentation quality graphics.

Therefore, the components of an inkjet system used for making graphics can be grouped into three major categories:

1. Computer, software, printer
2. Ink
3. Receptor medium

The computer, software, and printer will control the size, number and placement of the ink drops and will transport the receptor medium through the printer. The ink will contain the colorant that forms the image and carrier for that colorant. The receptor medium provides the repository that accepts and holds the ink. The quality of the inkjet image is a function of the total system. However, the compositions and interaction between the ink and receptor medium are most important in an inkjet system.

Image quality is what the viewing public and paying customers will want and demand to see. From the producer of the image graphic, many other obscure demands are also placed on the inkjet media/ink system from the print shop. Also, exposure to the environment can place additional demands on the media and ink (depending on the application of the graphic).

Current inkjet receptor media, direct coated with compositions according to the disclosure contained in U.S. Pat. No. 5,747,148 (Warner et al.) and in PCT Patent Publication Nos. WO 99/07558 (Warner et al.) and WO 99/03685 (Waller et al.), are marketed by Minnesota Mining and Manufacturing Company under the brands 3M™ Scotchcal™ Opaque Imaging Media 3657-10 and 3M™ Scotchcal™ Translucent Imaging Media 3637-20, 8522, and 8544, respectively. Another inkjet receptor media is disclosed in coassigned PCT Patent Publication No. WO 97/33758 (Steelman et al.) which combines a hygroscopic layer on a hydrophilic microporous media.

Inkjet inks are typically wholly or partially water-based, such as disclosed in U.S. Pat. No. 5,271,765. Typical receptors for these inks are plain papers or preferably specialty inkjet receptive papers which are treated or coated to improve their receptor properties or the quality of the images resulting therefrom, such as disclosed in U.S. Pat. No. 5,213,873.

Many inkjet receptor compositions suitable for coating onto plastics to make them inkjet receptive have been disclosed. Typically, these receptor layers are composed of mixtures of water-soluble polymers which can absorb the aqueous mixture which the inkjet ink comprises. Very common are hydrophilic layers comprising poly(vinyl pyrrolidone) or poly(vinyl alcohol), as exemplified by U.S. Pat. Nos. 4,379,804; 4,903,041; and 4,904,519. Also known are methods of crosslinking hydrophilic polymers in the receptor layers as disclosed in U.S. Pat. Nos. 4,649,064;

5,141,797; 5,023,129; 5,208,092; and 5,212,008. Other coating compositions contain water-absorbing particulates, such as inorganic oxides, as disclosed in U.S. Pat. Nos. 5,084,338; 5,023,129; and 5,002,825. Similar properties are found for inkjet paper receptor coatings, which also contain particulates, such as cornstarch as disclosed in U.S. Pat. Nos. 4,935,307 and 5,302,437.

The disadvantage that many of these types of inkjet receptor media suffer for image graphics is that they comprise water-sensitive polymer layers. Even if subsequently overlaminated, they still contain a water-soluble or water-swellable layer. This water-sensitive layer can be subject over time to extraction with water and can lead to damage of the graphic and liftoff of the overlaminate. Additionally, some of the common constituents of these hydrophilic coatings contain water-soluble polymers not ideally suitable to the heat and UV exposures experienced in exterior environments, thus limiting their exterior durability. Finally, the drying rate after printing of these materials appears slow since until dry, the coating is plasticized or even partially dissolved by the ink solvents (mainly water) so that the image can be easily damaged and can be tacky before it is dry.

In recent years, increasing interest has been shown in microporous films as inkjet receptors to address some or all of the above disadvantages. Both Warner et al. and Waller et al. publications and Steelman et al. application, identified above, disclose microporous films to advantage. If the film is absorbent to the ink, after printing the ink absorbs into the film itself into the pores by capillary action and feels dry very quickly because the ink is away from the surface of the printed graphic. The film need not necessarily contain water-soluble or water-swellable polymers, so potentially could be heat and UV resistant and need not be subject to water damage.

Porous films are not necessarily receptive to water-based inkjet if the material is inherently hydrophobic and methods of making them hydrophilic have been exemplified, for example, by PCT Patent Publication No. WO 92/07899.

Other films are inherently aqueous ink absorptive because of the film material, e.g., Teslin™ (a silica-filled polyolefin microporous film) available from PPG Industries and of the type exemplified in U.S. Pat. No. 4,861,644. Possible issues with this type of material are that if used with dye-based inks image density can be low depending on how much of the colorant remains inside the pores after drying. One way of avoiding this is to fuse the film following printing as exemplified in PCT Patent Publication No. WO 92/07899.

Other methods are to coat the microporous film with a receptor layer as disclosed in PCT Patent Publication No. WO 97/33758 (Steelman et al.) and U.S. Pat. No. 5,605,750.

As stated above, the relationship between the ink and the media is key to image graphic quality. With printers now reaching 1400×720 dpi precision, inkjet drop size is smaller than in the past. As stated previously, a typical drop size for this dpi precision, is about 20 picoliters, which is a fraction of the size of prior drop sizes of 140 picoliters used in wide format inkjet printers, most notably and commonly Encad™ NOVAJET III, IV, and Pro models. Some printer makers are striving for even smaller drop sizes, while other printer makers are content with the larger drop sizes for large format graphics. With pigmented inkjet inks, drop size determines the quantity of pigment particles that reside in each drop and are to be directed to a predetermined area of media.

When the inkjet ink drop contacts the receptor medium, a combination of two things occurs. The inkjet drop diffuses vertically into the medium and diffuses horizontally along the receptor surface, with a resulting spread of the dot.

However, with pigment-based inkjet inks of the right particle size and if used with a film of the right pore-size, some filtration of the colorant is possible at the surface of the film resulting in a good density and color saturation. However, images can still be very poor if dot-gain is low due to "banding phenomena" where insufficient ink remains to generate the appropriate halftone image. If dot-size is too small, then errors due to media advancement or failed printhead nozzles can cause banding. This problem would not be seen with larger drop size printers because larger dots could cover up prior printing errors. However, if dots are too large, then edge acuity is lost. Edge acuity is a reason for increased dpi image precision. Ability to control dot diameter is therefore an important property in an inkjet receptor medium.

U.S. Pat. No. 5,605,750 exemplifies a pseudo-boehmite coating applied to the silica-filled microporous film, such as Teslin™. The coating contains alumina particles of pseudo-boehmite of pore radius 10 to 80 Å. Also disclosed is an additional protective layer of hydroxypropylmethyl cellulose.

Several problems exist using receptor coatings mentioned above. The rate of ink absorption is, at most for a water-swellable coating, 8–10 ml/sec/$M^2$; this is slow when compared to the rate of ink drop application. Secondly, the volumes of ink applied by many popular wide format inkjet printers at 140 pL/drop (HP 2500: 20 pL /drop but 160 pL/dot) can create problems, such as "feathering", "demixing", and coalescence of the ink.

Because most of the printers in the office of today use water-based inks, when those printers and inks are used on conventional ink jet films, a lot of ink must be laid down to give suitable image density for transmitted images. When the ink is laid down rapidly on known films, such as those identified above, the ink tends to suffer from uncontrolled coalescence, or uneven gathering of the ink drops, resulting in streaking, banding and blotching. In order to avoid coalescence and give acceptable image quality, printers use a "transparency" mode which delivers the ink slowly over multiple passes. This results in much slower overall print speed and is a major source of dissatisfaction with making overhead transparencies on ink jet printers.

Coassigned PCT Patent Publication No. WO 99/55537 (Ylitalo et al.) "Microembossed Receptor Media", discloses the use of microembossed films for receiving and displaying images delivered by ink jet printers of various kinds, including those using water-based inks, with patterns with cavity size in the range of 20–1000 pL. This range was chosen to encompass the range of ink volumes of known printers, so that the number of cavities per area, or cavity density, was equal to or greater than the resolution or dots/inch ("dpi") of the printer.

SUMMARY OF INVENTION

Surprisingly, this invention provides excellent transparency printing results, achieved with cavity densities significantly below the dpi of the printer. Further, this invention has determined that the transparency of the microembossed transparent ink jet receptor is very sensitive to the geometry of the pattern and the fidelity of replication, so that the desirable range of cavity size and density is significantly different from U.S. patent application Ser. No. 09/713,610 (Ylitalo et al.), also PCT Patent Publication No. WO 99/55537, the disclosure of which is incorporated herein by reference.

There are two factors which are especially important for this unexpected invention:

(1) overall transparency on an overhead projector; and (2) quality of the image printed on the receptor.

Because of the optics of an overhead projector, anything in the optical path from light source to projection screen which causes light to miss the aperture of the collector head lens will cause less light to reach the projection screen. The collector head lens has a relatively narrow acceptance angle, since it is designed to collect light that is nearly collimated by the fresnel lens in the projector stage. Thus, if a transparency film has a microembossed surface that refracts, diffracts or diffuses too much light, the projected image intensity is reduced, and the image can appear dark or gray. The Visual Systems Division (VSD) of Minnesota Mining and Manufacturing Company (3M) of Austin, Tex., has found that Gardner Haze can be a good measure of the ability of a transparency film to reduce the light getting through the collector head lens. Gardner Haze is measured for all examples using a Gardner Hazemeter from BYK-Gardner Company (Columbia, Md. and D-82534 Geretsried, Germany), using ASTM D1003-97 "Standard Test Method for Haze and Luminous Transmittance of Transparent Plastics", the disclosure of which is incorporated herein by reference. Typical existing transparency films have Gardner Haze values of up to 15 percent.

This invention has utility for the production of image graphics using inkjet printers onto a transparency for use with overhead projection equipment commonly used in the office meeting room or university lecture hall or for other light transmission uses, such as backlit commercial signage or image graphics of decorative effect. This invention unexpectedly solves such common inkjet printing problems as feathering, banding, and mudcracking in inkjet printing systems by controlling how an inkjet drop contacts and dries on an inkjet receptor medium while also solving the problem of minimizing Gardner Haze as discussed above.

One aspect of the present invention is the use of microembossed surfaces which can give good to excellent results with desktop and large format ink jet printing of image graphics for transmission of light through the image graphic.

One aspect of the invention is an optically transmissive receptor medium comprising a sheet having a microembossed surface comprising cavities as one major surface thereof, wherein the sheet is nonporous, wherein each cavity of the receptor medium has a microembossed capacity of about 1100 pL to about 5000 pL, desirably greater than about 1200 pL and desirably less than about 5000 pL "Random" means one or more features of the microembossed elements are intentionally and/or systematically varied in a non-regular manner. Examples of features that are intentionally and/or systematically varied in a non-regular manner are pitch, peak-to-valley distance, depth, height, wall angle, post diameter, edge radius, and the like. "Microembossed element" means a recognizable geometric shape that either protrudes or is depressed. "Combination" patterns may, for example, comprise patterns that are random over an area having a minimum radius of ten element widths from any point, but these random patterns can be reproduced over larger distances within the overall pattern.

"Inverse pattern" means the resulting pattern produced from a sheet or solidifying liquid material contacts and conforms to a mold.

"Nonporous" means that the sheet is not substantially porous to liquids nor does it have a reticulated outer surface before the imaging surface is microembossed.

A "microembossed" surface has a topography wherein the average microembossed element pitch, that is, center to center distance between nearest elements, is from about 1 micrometers to about 1000 micrometers and the average peak to valley distances of individual features is from about 1 micrometers to about 100 micrometers.

"Microembossing" means embossing a surface and making it a microembossed surface, or causing a microembossed surface to be formed from a liquid which is solidified during the microembossing process.

Preferably, the receptor medium is an inkjet receptor medium.

Preferably, the microembossed imaging surface comprises cavities enclosed by walls, packed closely together, and with cavity volume commensurate with at least 100 percent ink from the targeted printer.

Another aspect of the present invention is an imaged inkjet receptor medium comprising a sheet having a microembossed image surface comprising cavities and particles of pigment or dye dried on the microembossed image surface.

Another aspect of the invention is a method of making an inkjet receptor medium, comprising the steps of: (a) selecting an embossing mold with a molding surface having a microembossed topography; and (b) contacting the molding surface of the mold against a polymeric sheet to form a microembossed surface on the sheet which is the inverse of the microembossed topography.

Another aspect of the invention is a method of making an inkjet receptor medium, comprising the steps of: (a) selecting an embossing mold with a molding surface having a microembossed topography; and (b) extruding a polymer over the molding surface of the mold to form a polymeric sheet having a microembossed surface on the sheet which is the inverse of the microembossed topography.

Another aspect of the invention is a method of making an inkjet receptor medium comprising the steps of: (a) selecting a microembossing mold with a molding surface having a microembossed topography; (b) contacting a fluid with the molding surface; and (c) solidifying the fluid to form a sheet having a microembossed surface topography which is the inverse of the molding surface, wherein the microembossed surface topography comprises cavities each having a volume of from about 1100 pL to about 5000 pL. Preferably, the fluid is a radiation curable fluid and the fluid is solidified by exposing the fluid to actinic radiation.

A feature of the invention is a microembossed topography that minimizes Gardner Haze to permit excellent transmission of light and fidelity of color of the image graphic created by the pigment or dye.

An advantage of the invention is the minimization of common inkjet printing problems, such as banding, feathering, bleeding, coalescence, and mudcracking, by altering the receiving surface of the inkjet receptor medium rather than altering the formulation of the inkjet inks.

Another advantage of the invention is the ease by which a microembossed image surface can be formed.

Another advantage of the present invention is the protection of the inkjet image from abrasion at the surface of the inkjet receptor medium because the colored entities forming the image reside within cavities of the topography of the microembossed image surface. As such, the medium of the present invention provides abrasion resistance, smear resistance, and prevention of feathering or bleeding of the image.

Another advantage of the invention is the usefulness of the microembossed image surface with organic solvent-based, water-based, phase change, or radiation polymerizable inks. The inks can further comprise either dye or pigment based colorants.

The embodiments of the invention that follow will identify other features and advantages.

EMBODIMENTS OF INVENTION

Microembossed Image Surface

Figure 1:
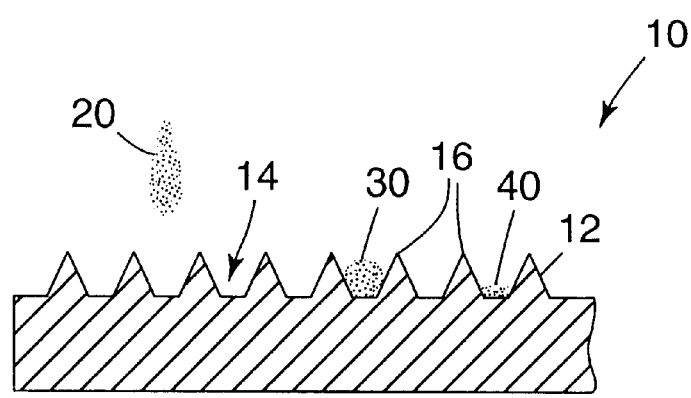
FIG. 1 is an illustrative cross-sectional view of an envisioned sequence of inkjet drop deposition, drying, and final appearance using random cavities.

FIG. 1 illustrates the premise of the present invention: an inkjet receptor medium 10 that can be constructed to have a microembossed image surface 12 of multiple cavities 14 for receiving and protecting pigment particles contained in an inkjet ink and multiple peaks 16.

At the left side of FIG. 1, one sees an inkjet drop 20, typically ranging in size from about 10 pL to about 150 pL, and preferably from about 20 pL to about 140 pL, approaching microembossed image surface 12.

In the middle of FIG. 1, one sees an inkjet drop 30 within one cavity 14 as drop 30 begins to dry, cure, or otherwise gather, depending on the nature of the inkjet ink formulation.

On the right of FIG. 1, one sees an inkjet drop 40 that has dried and resides within a cavity 14 such that it is protected from abrasion from items contacting the multiplicity of peaks 16 that, on a macroscopic level, constitute the outermost surface of medium 10.

FIG. 1 also illustrates an important consideration of the invention: more than one drop of ink is destined to reside in a single cavity, because mixing of the colors: cyan, yellow, and magenta are needed to create the infinite number of colors now demanded in inkjet printing.

Polymeric Film

The polymeric sheet used in the inkjet medium can be made from any polymer capable of being microembossed in the manner of the present invention. The sheet can be a solid film. The sheet should be transparent or translucent, depending on desired usage. The sheet can be clear or tinted, depending on desired usage. The sheet should be optically transmissive.

Non-limiting examples of polymeric films include thermoplastics, such as polyolefins, poly(vinyl chloride), copolymers of ethylene with vinyl acetate or vinyl alcohol, polycarbonate, norbornene copolymers, fluorinated thermoplastics, such as copolymers and terpolymers of hexafluoropropylene and surface modified versions thereof, poly(ethylene terephthalate) and copolymers thereof, polyurethanes, polyimides, acrylics, and filled versions of the above using fillers, such as silicates, aluminates, feldspar, talc, calcium carbonate, titanium dioxide, and the like. Also useful in the application are coextruded films and laminated films made from the materials listed above.

More specifically, transparent or transmissive polyolefins can be ethylene homopolymers or copolymers, such as "ENGAGE" brand ethylene-octene copolymer commercially available from Dow Chemical Company, Midland, Mich. Other specifically useful films include LEXAN polycarbonate from General Electric Plastics of Pittsfield, Mass.; ZEONEX polymer from B. F. Goodrich of Richfield, Ohio; THV-500 polymer from Dyneon LLC of Oakdale, Minn.; plasticized poly(vinyl chloride), poly(ethylene terephthalate) copolymer EASTAR 6763 from Eastman, AFFINITY PL 1845 from Dow Chemical Company, and SURLYN methacrylic acid copolymers from DuPont.

Properties of polymeric sheets of the present invention can be augmented with outer coatings that improve control of the ink receptivity of the microembossed image surface 12 of the ink receptor medium 10. As stated in the Background of the Invention above, any number of coatings are known to those skilled in the art. It is possible to employ any of these coatings in combination with the microembossed image surface of the present invention.

Preferably, one can employ a fluid management system as disclosed in PCT Patent Publication No. WO 99/03685 and its copending, coassigned U.S. patent application Ser. No. 08/892,902 (Waller et al.), the disclosure of which is incorporated herein by reference. Briefly, a variety of surfactants or polymers can be chosen to provide particularly suitable surfaces for the particular fluid components of the pigmented inkjet inks. Surfactants can be cationic, anionic, nonionic, or zwitterionic. Many of each type of surfactant are widely available to one skilled in the art. Accordingly, any surfactant or combination of surfactants or polymer(s) that will render said substrate hydrophilic could be employed.

These surfactants can be imbibed into recessed surfaces of the microembossed substrate. Various types of surfactants have been used in the coating systems. These may include, but are not limited to, fluorochemical, silicon, and hydrocarbon-based ones wherein the said surfactants may be cationic, anionic, or nonionic.

Various types of non-ionic surfactants can be used, including but not limited to: Dupont's ZONYL fluorocarbons (for example, ZONYL FSO); BASF's (PLURONIC) block copolymers of ethylene and propylene oxide to an ethylene glycol base; ICI's (TWEEN) polyoxyethylene sorbitan fatty acid esters; Rohm and Haas's (TRITON X series) octylphenoxy polyethoxy ethanol; Air Products and Chemicals, Inc. (SURFYNOL) tetramethyl decynediol; and Union Carbide's SILWET L-7614 and L-7607 silicon surfactants, and the like, known to those skilled in the art.

Various types of hydrocarbon-based anionic surfactants can also be used, including but not limited to: American Cyanamid's (Aerosol OT) surfactants like dioctylsulfosuccinate-Na-salt or dialkylsulfosuccinate-Na-salt.

Various types of cationic surfactants can also be used, including but not limited to: benzalkonium chloride, a typical quaternary ammonium salt.

Other coating materials may be used which are intended to improve the appearance or durability of the microembossed and printed substrate. Many examples of inkjet receptor coatings may be found in the patent literature, for example, boehmite alumina based coatings, silica based coatings, and the like should not be considered outside the scope of the invention. If the targeted printer prints aqueous dye inks, then a suitable mordant may be coated onto the microembossed surface in order to demobilize or "fix" the dyes. Mordants which may be used generally consist of, but are not limited to, those found in patents such as U.S. Pat. Nos. 4,500,631; 5,342,688; 5,354,813; 5,589,269; and 5,712,027. Various blends of these materials with other coating materials listed herein are also within the scope of the invention.

Additionally, directly affecting the substrate by means generally known in the art may be employed in the context of this invention. For example, corona treated poly(olefins) or surface dehydrochlorinated poly(vinyl chloride) could be microembossed and used as a printable substrate. Otherwise, these and other polymers could be microembossed and then corona treated to make them more suitable as printable substrates.

Optional Adhesive Layer and Optional Release Liner

The receptor medium 10 optionally has an adhesive layer on the major surface of the sheet opposite microembossed image surface 12 that is also optionally but preferably protected by a release liner. After imaging, the receptor medium 10 can be adhered to a horizontal or vertical, interior or exterior surface to warn, educate, entertain, advertise, etc.

The choice of adhesive and release liner depends on usage desired for the image graphic. Optically transmissive adhesives are preferred.

Pressure-sensitive adhesives can be any conventional pressure-sensitive adhesives that adheres to both the polymer sheet and to the surface of the item upon which the inkjet receptor medium having the permanent, precise image is destined to be placed. Pressure-sensitive adhesives are generally described in Satas, Ed., *Handbook of Pressure Sensitive Adhesives,* 2nd Ed. (Von Nostrand Reinhold 1989), the disclosure of which is incorporated herein by reference. Pressure-sensitive adhesives are commercially available from a number of sources. Particularly preferred are acrylate pressure-sensitive adhesives commercially available from Minnesota Mining and Manufacturing Company and generally described in U.S. Pat. Nos. 5,141,790; 4,605,592; 5,045,386; and 5,229,207, and EPO Patent Publication No. EP 0 570 515 B1 (Steelman et al.).

Release liners are also well known and commercially available from a number of sources. Non-limiting examples of release liners include silicone coated kraft paper, silicone coated polyethylene coated paper, silicone coated or non-coated polymeric materials, such as polyethylene or polypropylene, as well as the aforementioned base materials coated with polymeric release agents, such as silicone urea, urethanes, and long chain alkyl acrylates, such as defined in U.S. Pat. Nos. 3,957,724; 4,567,073; 4,313,988; 3,997,702; 4,614,667; 5,202,190; and 5,290,615; the disclosures of which are incorporated herein by reference and those liners commercially available as POLYSLIK brand liners from Rexam Release of Oakbrook, Ill., and EXHERE brand liners from P. H. Glatfelter Company of Spring Grove, Pa.

Method of Forming Microembossed Image Surface

The microembossed image surface can be made from any contacting technique, such as casting, coating, or compressing techniques. More particularly, microembossing can be achieved by at least any of: (1) casting a molten thermoplastic using a tool having a microembossed pattern; (2) coating of a fluid onto a tool having that microembossed pattern, solidifying the fluid, and removing the resulting microembossed solid; or (3) passing a thermoplastic film through a nip roll to compress against a tool having that microembossed pattern. Desired embossing topography can be formed in tools via any of a number of techniques well known to those skilled in the art, selected depending in part upon the tool material and features of the desired topography. Illustrative techniques include etching (for example, via chemical etching, mechanical etching, or other ablative means, such as laser ablation or reactive ion etching, etc.), photolithography, stereolithography, micromachining, knurling (for example, cutting knurling or acid enhanced knurling), scoring or cutting, etc.

Alternative methods of forming the microembossed image surface include thermoplastic extrusion, curable fluid coating methods, and embossing thermoplastic layers, which can also be cured.

A preferred embossing tooling can be made by casting a two-part curable silicone material over a master mold which has the same pattern as desired for the microembossed image surface 12 of the inkjet receptor medium 10. The silicone mold therefore has the inverse image (cavity-forming geometry protruding). This mold can then be used in a hot press or in actual extrusion or casting operations. Extrusion embossing is accomplished by passing the mold through the nip to make microembossed sections on the extruded film. Another preferred tool for extrusion embossing is a metal casting roll which itself carries the negative of the pattern which is to be microembossed on the thermoplastic sheet.

Compressing Method

This method uses a hot press familiar to those skilled in the art of compression molding.

The pressure exerted in the press typically ranges from about $4.1 \times 10^4$ kPa to about $1.38 \times 10^5$ kPa and preferably from about $6.9 \times 10^4$ kPa to about $1.0 \times 10^5$ kPa.

The temperature of the press at the mold surface typically ranges from about 100° C. to about 200° C. and preferably from about 110° C. to about 150° C.

The dwell time of pressure and temperature in the press typically ranges from about 1 minute to about 5 minutes. The pressure, temperature and dwell time used depend primarily on the particular material being microembossed, as is well known to those skilled in the art. The process conditions should be sufficient to cause the material to flow and faithfully take the shape of the surface of the tool being used. Any generally available commercial hot press may be used, such as Wabash Model 20-122TM2WCB press from Wabash MPI of Wabash, Ind.

Extrusion Method

A typical extrusion process for the present invention involves passing an extruded substrate through a nip created by a chilled roll and a casting roll having a surface having a pattern inverse of desired microembossed image surface, with the two rolls rotating in opposite directions. A flexible sheet or belt comprising the tool may also be used and put through the nip simultaneously with the melt. Single screw or twin screw extruders can be used. Conditions are chosen to meet the general requirements which are understood to the skilled artisan. Representative but non-limiting conditions are outlined below.

The temperature profile in the extruder can range from 100° C. to 250° C. depending on the melt characteristics of the resin.

The temperature at the die ranges from 150° C. to 230° C. depending on the melt strength of the resin.

The force exerted in the nip can range from about 6 kN/m to about 150 kN/m and preferably from about 10 kN/m to about 100 kN/m.

The temperature of the nip roll can range from about 5° C. to about 150° C. and preferably from about 10° C. to about 100° C., and the temperature of the cast roll can range from about 25° C. to about 100° C. and preferably about 40° C. to about 60° C.

The speed of movement through the nip typically ranges from about 0.25 n/min to about 10 n/min and preferably as fast as conditions allow.

Non-limiting examples of equipment useful for this extrusion method include single screw extruders, such as a 1¼ inch Killion (Killion Extruders, Inc. of Cedar Grove, N.J.) equipped with a gear pump, such as a Zenith gear pump to control flow rate, co-rotating twin screw extruders, such as a 25 mm Berstorff (Berstorff Corporation of Charlotte, N.C.) and counter-rotating twin screw extruders, such as a 30 mm Leistritz (American Leistritz Extruder Corporation of Somerville, N.J.). Flow rate in the twin screw extruder can be controlled using weight loss feeders, such as a K-tron (K-tron America of Pittman, N.J.) to feed the raw material into the extruder. A film die with adjustable slot is used to form a uniform film out of the extruder.

Casting Method

Embodiments of the optically transmissive microembossed receptor media may also be made using a casting process. A typical casting process comprises the steps of providing a tool having a molding surface having a suitable pattern inverse of desired microembossed image surface; applying a volume of a flowable resin composition to the molding surface; contacting the resin composition with a first major surface of a film; minimizing excess resin composition between the film and molding surface; curing the resin composition to form a sheeting comprising the microembossed cavities bonded to the film; and removing the sheeting from the tool. Further details of the casting method are described in U.S. Pat. Nos. 5,183,597 and 5,304,223, incorporated herein by reference for the casting process, and PCT Patent Publication No. WO 95/11464.

A wide variety of radiation curable materials are suitable for use in the above method for making the microembossed receptor media of the invention. Examples of such materials are described in U.S. Pat. Nos. 4,576,850 and 4,582,885, both incorporated herein by reference for said materials. The combination of monomers, oligomers and initiators in order to obtain particular combinations of physical and chemical properties is known to those skilled in the art. Commercial suppliers of such materials include Henkel (Amber, Pa.), Sartomer (Exton, Pa.), UCB (Smyrna, Ga.), and Ciba-Geigy (Hawthorne, N.Y.).

Usefulness of the Invention

Inkjet receptor media of the present invention can be employed in any environment where inkjet images are desired to be precise, stable, rapid drying, and abrasion resistant.

Moreover, these inkjet receptor media are optically transmissive. One measure of such optical transmission is Gardner Haze as identified above. For the inkjet receptor media of the present invention, the Gardner Haze, measured in Percentage Haze, ranges from about 0 percent to about 40 percent and preferably from about 0 percent to about 20 percent. At these values, media of the present invention are useful for optical transparent or translucent applications. Non-limiting examples of such uses include overhead transparencies, backlit signage, label stock, security cards, and the like.

Inkjet receptor media of the present invention can accept a variety of inkjet ink formulations to produce rapid drying and precise inkjet images. The topography of the microembossed image surface of the inkjet receptor medium can be varied for optimum results, depending on several factors, such as: ink droplet volume; ink liquid carrier composition; ink type (pigment or blend of pigment and aqueous or non-aqueous dye); and manufacturing technique (machine speed, resolution, roller configuration); etc.

The imaging surface of the present invention has been found to control dot location to remain within isolated cavities 14 of surface 12, yet unexpectedly remain sufficiently translucent or transparent to be useful in optically transmissive applications.

For example, a test pattern of three overlapping circles of primary colors (cyan, magenta, yellow), secondary colors (red, green, blue) and tertiary color (black) inkjet ink printed onto an inkjet receptor medium of the present invention shows the precision of color control and pigment location on the medium.

Further, because the pigment or dye particles reside beneath the nominal macroscopic surface of the inkjet receptor medium, the pigment or dye particles are protected from abrasion that does not penetrate as deep as the location of the particles. Incidental abrasion of the graphic during graphic handling after printing is minimized.

The possibilities of image manipulation on the surface of an inkjet receptor medium, created by the topography of the image surface of that medium, are myriad to those skilled in the art, because the same pattern need not cover the entire surface of the medium. For example, different patterns could be employed, stepwise, in gradation, or randomly across an area of inkjet receptor medium, in order to create structured or unstructured appearances for the images printed thereon while providing optical transmissivity nonetheless.

For example, one skilled in the art could use either regular. microembossed patterns as disclosed in copending, coassigned, U.S. patent application Ser. No. 09/713,610 (Ylitalo et al.), also PCT Patent Publication No. WO 99/55537, or random microembossed patterns as disclosed in copending, coassigned, U.S. patent application Ser. No. 09/583,295, filed May 31, 2000, also PCT Patent Publication No. WO 00/73082, for the large feature patterns of the present invention. Both applications are incorporated herein by reference. Moreover, one could use a multilayered microembossed pattern in which the cavity walls and floors are made of substantially different materials, in order to manage coalescence of ink on cavity floors of media of the present invention.

Further, as the skill of inkjet printing increases, both in terms of ink drop size and in terms of inkjet placement, it could become possible that the half tone printing pattern will be so refined as to align the printing pattern of the ink, drop by drop, with the microembossed pattern on the medium, cavity by cavity. That would permit full justification of the printing process resembling the image displayed on a digital color monitor.

Another benefit of the media of the present invention is the control of the dry time of the ink drop in each cavity. Drying can be measured as the time required before the image becomes tack free or does not smear when lightly rubbed. The use of isolated cavities to minimize migration of color during drying is an advantage in the receptor medium of the invention.

The formation of precise inkjet images is provided by a variety of commercially available printers. Non-limiting examples include thermal inkjet printers, such as DeskJet brand, PaintJet brand, Deskwriter brand, DesignJet brand, and other printers commercially available from Hewlett-Packard Corporation. Also included are piezo type inkjet printers, such as those from Seiko-Epson, Raster Graphics, and Xerox, spray jet printers and continuous inkjet printers. Any of these commercially available printers introduces the ink in a jet spray of a specific image into the medium of the present invention. Drying is much more rapid under the present invention than if the imaging layer were to be applied to a similar non-microembossed media.

The media of the present invention can be used with a variety of inkjet inks obtainable from a variety of commercial sources. It should be understood that each of these inks has a different formulation, even for different colors within the same ink family. Non-limiting sources include Minnesota Mining and Manufacturing Company, Encad Corporation, Hewlett-Packard Corporation, NuKote, and the like. These inks are preferably designed to work with the inkjet printers described immediately above and in the background section above, although the specifications of the printers and the inks will have to be reviewed for appropriate drop volumes and dpi in order to further refine the usefulness of the present invention.

Media of the present invention can also be employed with other jettable materials, that is, those materials capable of passing through an inkjet printing head. Non-limiting examples of jettable materials include adhesives, biological fluids, chemical assay reagents, pharmaceuticals, particulate dispersions, waxes, and combinations thereof.

Media of the present invention can also be employed with non-jettable materials so long as an inkjet printing head is not needed to deposit the material on the microembossed surface. For example, U.S. Pat. No. 5,658,802 (Hayes et al.) discloses printed arrays for DNA, immunoassay reagents or the like using arrays of electromechanical dispensers to form extremely small drops of fluid and locate them precisely on substrate surfaces in miniature arrays.

The following examples further disclose embodiments of the invention.

General Information

Topography of both microembossed and smooth surfaces were examined by interferometry using an interferometric microscope, such as Wyko Roughness/Step Tester available from the Veeco Instruments of Plainview, N.Y., or alternatively were examined by scanning electron microscopy or by optical microscopy where equipped for depth measurement (z-axis micrometer).

Compression Molding can be done in a number of ways. One skilled in the art will recognize the utility of various methods used. Most commonly, a metal tool (surface of nickel or chrome) impressed with the pattern in question, was used directly in compression molding against a thermoplastic material at sufficient temperature, pressure, and time to replicate the inverse of the pattern onto the thermoplastic. Alternatively, metal tooling can be used as a mold against which to cast a curable silicone rubber which can subsequently be used in compression molding. Finally, microembossed thermoplastics can also be used as templates against which curable silicone rubber is cast. Polyimide in particular is useful for both silicone casting and compression molding of lower melting thermoplastics.

Desktop printers: Hewlett-Packard Corporation HP 800 series printers (855, 870, 892): dye inks with pigmented black, drop size around 20 pL, used in "plain paper" printing mode at "normal" printing speed or "transparency" mode at "normal" speed. HP 2000: dye inks with pigmented black, drop size around 20 pL, used in "plain paper" mode at either "Econofast" or "normal" speed, or "transparency" mode at "normal" or "presentation" speed, or "rapid dry transparency" mode at "presentation" speed. UV Curable Inks: Trident BASIC PIXELET Evaluation Kit #064-1010-01 at 172×172 or 344×344 dpi.

Test patterns: Desktop prints were made using either "TEST PATTERN 1", a standard Minnesota Mining and Manufacturing Company print test which comprises color blocks with thin lines of other colors intersecting them, or "TEST PATTERN 2", a test pattern which writes black pigmented text over color blocks.

EXAMPLES

Example 1

Generation of Substrates and Gardner Haze

In this example, large features are shown to provide acceptable Gardner Haze in an image projected by an overhead projector. Gardner Haze is measured for all examples using a Gardner Hazemeter from BYK-Gardner Company (Columbia, Md. and D-82534 Geretsried, Germany), using ASTM D1003-97 "Standard Test Method for Haze and Luminous Transmittance of Transparent Plastics", the disclosure of which is incorporated herein by reference.

Four topographies were generated on polyimide film (DuPont of Wilmington, Del.) by laser ablation. All patterns comprised inverse images of closely packed square cavities having a height (H); wall thickness at the wall top (B); an angle (A) of wall to a plane perpendicular to the plane of the sheet; and pitch (P) or center-to-center distance between adjoining cavities. The polyimide film was used in compression molding of polycarbonate film (General Electric, Fairfield, Conn.) such that replication is essentially complete via interferometry. The dimensions of the cavities formed in the polycarbonate film are outlined in Table 1. Also shown is the calculated percent non-planar area, or % NPA, of each topography. Generally, the % NPA of the invention is 10 percent or less. The % NPA comprises the theoretical non-parallel, non-perpendicular area of the sheet when the sheet is situated horizontally. Finally, Table I contains the measured value for Gardner Haze.

TABLE 1

| Pattern Name | P ($\mu$m) | A (°) | B ($\mu$m) | H ($\mu$m) | % NPA | Haze |
|---|---|---|---|---|---|---|
| 200 LPI | 125 | 7 | 16 | 25 | 12 | 25 |
| 100 LPI | 250 | 7 | 16 | 25 | 6.6 | 15.3 |
| 75 LPI | 338.7 | 14.5 | 4 | 25 | 7.3 | 11.3 |
| 50 LPI | 508 | 14.5 | 3 | 25 | 5.4 | 7.5 |
| none | na | na | na | 0 | 0 | <1 |

As the size of the cavities increases, both the theoretical % NPA and actual haze decrease. The "200 LPI" pattern gives haze which is considered aesthetically too high for overhead projector transparency applications, while 100, 75, and 50 LPI provide acceptable haze.

Example 2

Effect of Mastering Method on Haze Performance

The amount of haze resulting from the light scattered from the microembossed receptor surface is minimized by controlling certain aspects of the design, for example, by requiring steep wall angles and close to zero radius (sharp) corners. The machining method chosen to fabricate a microembossed surface can ultimately have an effect on transparency film performance parameters, such as haze. The minimum corner radius achievable using one machining method may be much larger than that attainable using another. If a given mastering technique cannot produce corners with radii less than a few micrometers, there is likely to be a significant amount of light refracted from these corners in undesired directions. The cumulative effect of this extraneous refracted light over a relatively large area of microembossed surface could contribute to an increased percent haze over that from another film that is identical to the first in all respects except having features with much sharper corners. There are other subtle differences in surface structure related to mastering method that could also affect haze, for example, differences in flatness and surface finish of the planar areas that are parallel to the back of the film could produce different types and amounts of scattering that might influence haze.

The correlation in haze performance between microembossed films made using two commonly used machining techniques was measured. The first mastering technique, laser ablation, is described in PCT Patent Publication No. WO 96/33839, the disclosure of which is incorporated herein by reference. A second mastering technique, precision diamond machining is described in "Manufacturers Turn Precision Optics with Diamond", by E. Ray McClure, Laser Focus World, February 1991, pp. 95–105. These techniques were used to fabricate one master die each using the same 75 LPI closely packed square void surface structure design (Example 1). Magnified images of each of these were made using scanning electron microscopy (SEM). The master that was made using laser ablation had corner radii of approximately 2 micrometers, more than an order of magnitude greater than the corner radii of the master made using diamond machining. Nickel molds replicated from each of the two master dies were used to emboss blank films of 250 micron thick clear LEXAN Polycarbonate (available from the General Electric Company, Pittsfield, Mass.). Both of the polycarbonate films were microembossed by pressing at 190° C. and 5 tons of load for 2 minutes followed by another 2 minutes at 190° C. under 10 tons of load. The percent haze of each microembossed polycarbonate film was measured using a "haze meter", such as those manufactured by the BYK-Gardner Company (Columbia, Md. and D-82534 Geretsried, Germany), using ASTM D1003-97 "Standard Test Method for Haze and Luminous Transmittance of Transparent Plastics". An unexpected result of this experiment was that the measured percent haze value was the same, 7.5 percent for both the microembossed film samples, independent of the mastering technique used to fabricate the microembossed surface master die. Generally, the receptor media of the invention have a Gardner Haze of from about 0 to about 20 with values of about 0 to about 10 being preferred.

Example 3

Coalescence Control in Projected Images— Hydrophobic Surface

In this experiment, we will show how coalesced inks on surfaces still provide uniform projected images when the surface to be printed comprises patterns of the current invention.

Figure 2:
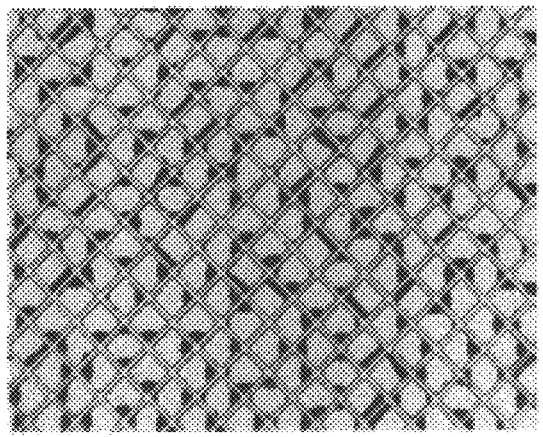
FIGS. 2–7 show various digital images of controls and media of the present invention as imaged.
Figure 3:
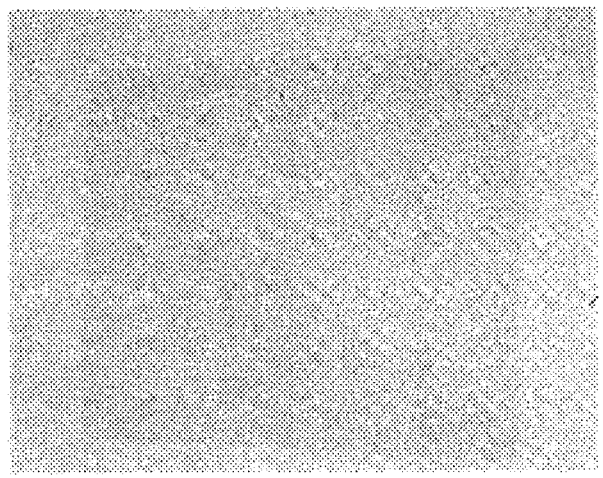

Transparent poly(vinyl chloride) (Scotchcal™ Translucent Film, available from Minnesota Mining and Manufacturing Company) was microembossed with the 100 LPI pattern and was printed upon by an HP 890C ink jet printer in "plain paper" mode, "Econofast" speed. The result was a very uniform appearing image, compared to the blotchy image obtained with even a normal ink jet receptor film, such as CG3460 (obtained from Minnesota Mining and Manufacturing Company) or Hewlett-Packard Corporation's "Rapid-Dry" Inkjet Transparency sheets (obtained from the Hewlett-Packard Corporation). However, the image on the microembossed film was of low density because the ink beads up in the corners of the cavities on the low energy poly(vinyl chloride) surface. Micrographs of this example show that the ink coalesces in a regular pattern, being confined within individual cells, and thus provides a uniform appearance when viewed as a projected image on an overhead projector, such as the Minnesota Mining and Manufacturing Company 2150 overhead projector, available from Minnesota Mining and Manufacturing Company through its Visual Systems Division located in Austin, Tex. FIG. 2 shows a digital image of a micrograph (50×) of Example 3. FIG. 3 shows a digital image of the projected image using a Minnesota Mining and Manufacturing Company 2150 overhead projector of the micrograph (50×) of Example 3.

Example 4

Comparisons of Various PVP:Primacor Based Coatings With Top Layer; Variable Well Depths, 100 LPI Pattern In this experiment, we will show that good dry times, image density, and coalescence control can all be had by using microembossed hydrophilic coatings.

PET (polyester film from Minnesota Mining and Manufacturing Company) was coated with about 20 micrometers of various blend ratios of poly(N-vinyl pyrrolidinone) (PVP-K90, obtained from ISP Corp. of Wayne, N.J.) and an ethylene-acrylic acid copolymer (Primacor, Dow Chemical Company) topped with 6 micrometers of the colloidal alumina-methylcellulose surfactant and a cationic resin dispersion as disclosed in PCT Patent Publication No. WO 99/39914), the disclosure of which is incorporated herein by reference ("Ali"). The samples. were microembossed with the 100 LPI patterns via compression molding. Coating compositions and depth of microembossed cavities of the 100 LPI pattern are shown in Table 2 below.

TABLE 2

A.) Sample Identities and Haze

| Sample No. | Well Depth | Haze | Identity |
|---|---|---|---|
| 1 | 12–14 micrometers | 21–26% | 70:30 PVP:Primacor, 21 mic.; Topcoat "Ali" 6 micrometers |
| 2 | 20–25 micrometers | 18–24% | 70:30 PVP:Primacor, 21 mic.; Topcoat "Ali" 6 micrometers |
| 3 | 12 micrometers | 23–24% | 85:15 PVP:Primacor, 20 mic.; Topcoat "Ali" 6 micrometers |
| 4 | 25 micrometers | 16–18% | 85:15 PVP:Primacor, 20 mic.; Topcoat "Ali" 6 micrometers |
| 5 | 20 micrometers | 16–24% | 85:15 PVP:Primacor + 15% Pycal, 22 mic.; Topcoat "Ali" 6 micrometers |
| 6 | 25 micrometers | 19–24% | 85:15 PVP:Primacor + 15% Pycal, 22 mic.; Topcoat "Ali" 6 micrometers |
| 7 | — | — | CG3420, Control |

These samples were then printed upon using an HP 890C printer in "plain paper" mode, "Econofast" speed, manual color adjustment with full dark intensity and scatter halftoning with the pigmented black ink. Dry time for a 1 inch square (2.54×2.54 cm) black box is less than one second. The resulting densities were measured by MacBeth Densitometer and are shown below in Table 3.

TABLE 3

B.) HP 890C Printer: Black Box Density, Plain Paper, Econofast Mode
Manual Color: Full Dark Density, Yellow Status A Filter, MacBeth Densitometer

| Sample No. | 1 | 2 | 3 | 4 | 5 | 6 | 7 |
|---|---|---|---|---|---|---|---|
| Density | 0.75 | 0.59 | 0.66 | 0.56 | 0.60 | 0.54 | 0.62 |

The results showed that coalescence was well-controlled. In the following tables, various printers in various print modes as shown were used to test dry time and image density for full color images. Image density was measured by Macbeth Densitometer. Dry time was measured by waiting for either 30 or 60 seconds after the print is removed from the printer before placing paper over the print and rolling a 5 pounds (2.26 kg) roller over the paper. The reflective image density of any ink transferred to the paper was then read using a MacBeth Densitometer. These results are shown in Tables 4 and 5 below.

TABLE 4

C.) HP 890C Printer: Color and Black Densities Using Transparency Mode
TEST PATTERN: 2 Pattern, Transparency, Best Quality Mode; Color: Automatic

| | | Image Densities | | | | | |
|---|---|---|---|---|---|---|---|
| Sample No. | Well Depth | Cyan (R) | Magenta (G) | Yellow (B) | Red (G, B) | Green (R, B) | Blue (R, G) | Black (Y) |
| 1 | 12–14 mic | 1.25 | 1.13 | 0.91 | 1.15, .85 | 1.01, .72 | 1.28, .59 | 1.43 |
| 2 | 20–25 mic | 1.19 | 1.06 | 0.82 | 1.02, .81 | .88, .68 | 1.17, .55 | 1.36 |
| 3 | 12 mic | 1.27 | 1.13 | 0.86 | 1.05, .81 | .95, .70 | 1.41, .60 | 1.47 |
| 4 | 25 mic | 1.10 | 0.96 | 0.76 | .92, .77 | .75, .63 | 1.01, .52 | 1.26 |
| 5 | 20 mic | 1.31 | 1.14 | 0.92 | 1.16, .84 | 1.01, .71 | 1.41, .61 | 1.48 |
| 6 | 25 mic | 1.17 | 1.01 | 0.79 | .96, .79 | .81, .66 | 1.06, .54 | 1.38 |
| 7 | — | 1.64 | 1.32 | 0.94 | 1.17, .87 | 1.11, .73 | 1.57, .61 | 1.60 |

TABLE 5

D.) HP 890C Printer: Drytimes. Black, Red, Green, Blue Boxes Printed in Transparency Mode, Best Quality; Color: Automatic

| Sample No. | Delay (Second) | Black (Y) | Red (G, B) | Green (R, B) | Blue (R, G) |
|---|---|---|---|---|---|
| 1 | 60 | 0.01 | .03, 0 | 0, 0 | .01, 0 |
| 1 | 30 | 0.07 | .03, .01 | 0, 0 | .02, .01 |
| 2 | 30 | 0.08 | 0, 0 | 0, 0 | 0, 0 |
| 3 | 30 | 0 | .09, .02 | .04, 0 | .04, .02 |
| 4 | 30 | 0 | .03, .01 | 0, 0 | 0, 0 |
| 5 | 30 | 0.01 | .09, .03 | .05, .01 | .06, .03 |
| 6 | 30 | 0 | .05, .01 | 0, 0 | 0, 0 |
| 7 | 60 | 0.13 | .04, .01 | 0 | 0 |
| 7 | 30 | 0.19 | .07, .02 | .04, .00 | .04, .02 |

Finally, the same set of tests with the same set of substrates was carried out on the HP 2000 printer. The results of dry time analysis are shown below in Table 6.

TABLE 6

E.) HP 2000C Printer: Drytimes, Black, Red, Green, Blue Boxes, Imaged in "Rapid Dry Transparency" Mode, Normal Quality; Color: Automatic

| Sample No. | Black (Y) | Red (G, B) | Green (R, B) | Blue (R, G) |
|---|---|---|---|---|
| 1 | 0.13 | .09, .17 | .09, .09 | .09, .04 |
| 2 | 0.12 | .04, .07 | .02, .02 | .03, .01 |
| 3 | 0.04 | .14, .22 | .13, .12 | .19, .09 |
| 4 | 0 | .10, .16 | .07, .06 | .09, .04 |
| 5 | 0.04 | .17, .23 | .16, .13 | .25, .14 |
| 6 | 0.03 | .16, .22 | .16, .13 | .16, .09 |
| 7 | 0.24 | .10, .15 | .08, .06 | .10, .04 |

Example 5

Effect of Embossing on Coalescence Using Very Fast Print Speeds—Swellable Coatings This example shows that image defects due to non-uniform coalescing of ink droplets on the surface of swellable coatings can be eliminated by embossing the surface with patterns of the current invention. These defects include beading, pooling and banding. Banding results from adjacent rows of droplets coalescing and contracting and not overlapping with succeeding rows of droplets as the printhead proceeds in incremental jumps. These image defects minimize the speed at which ink jet films may be printed and embossing can therefore allow much faster print speeds.

A sheet of T120 Computer Graphics Film (Minnesota Mining and Manufacturing Company no longer available), consisting of a 1:1 blend by weight if polyvinylpyrolidone, (PVPK90, available from International Specialty Products, ISP), and polyvinylalchohol (Airvol 540, available from Air Products), coated at approximately 1.2 g/ft2 (12.9 g/m2) was printed using an HP 890C inkjet printer in "plain paper" mode, "Econofast" speed, "manual" color adjustment with full dark density and "Scatter" halftoning. A 1 in$^2$ (2.54cm× 2.54 cm) black box was printed with the pigmented ink, requiring less than one second to print. The resulting image shows extensive coalescence, with large openings occurring in near linear arrays.

Figure 6:
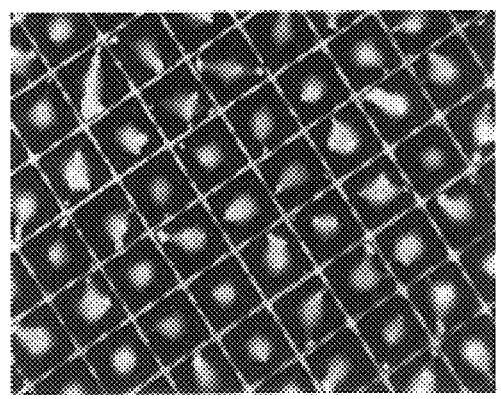
Figure 7:
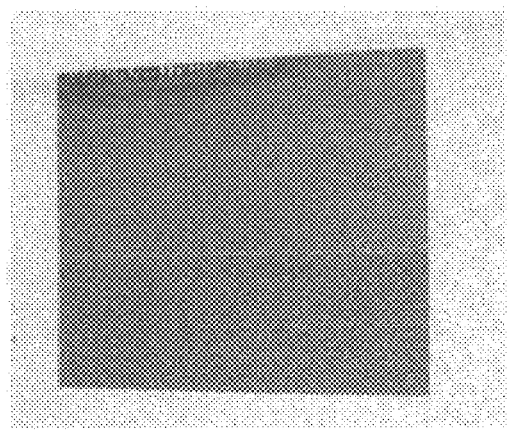

A second sample of the above film was subjected to compression molding against nickel tooling to form a 100 LPI pattern on the coated surface. This sheet was printed in a manner identical to that described in this Example above. The digital image of the micrograph of FIG. 6 shows the ink to be compartmentalized, with uniform openings and inked areas in all directions. As a result, the screen image is totally uniform and free from banding, as well as any other visual defects as shown in the digital image of FIG. 7.

Figure 4:
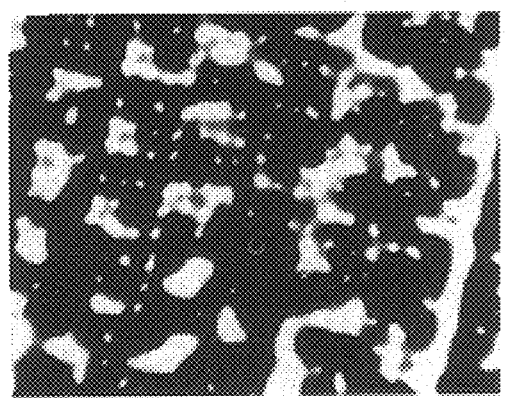
Figure 5:
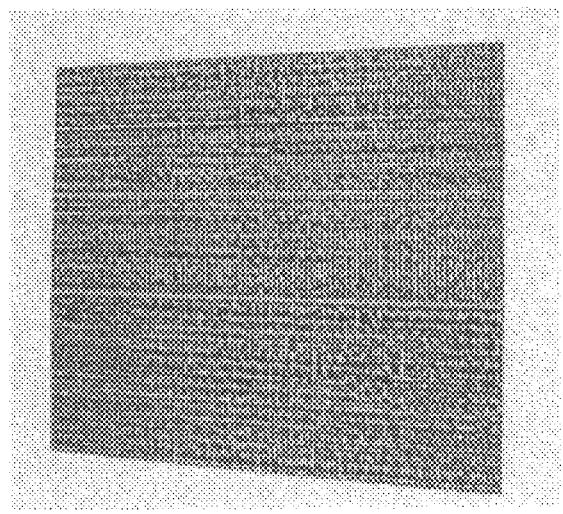

Coalescence using fast print speeds on swellable coatings is typically worse than above. The projected screen image and micrograph are shown for commercial ink jet printer film CG3420 (available from Minnesota Mining and Manufacturing Company), printed in a manner identical to above. Extensive coalescence results in a very mottled and unacceptable image on the screen as shown in FIG. 4 and FIG. 5 is a digital image of a micrograph of this sample.

Example 6

Using a Trident Basic PixelJet Evaluation Kit #064-1010-01 from Trident International Inks of Brookfield, Conn., print tests were carried out on microembossed media of the current invention. Pigmented black UV curable ink, from Sun Chemical of Fort Lee, N.J., was used to make a test pattern consisting of large font size text. The printhead was used to deliver 172×172 dpi at 90 pL/drop.

Poly(vinyl chloride) samples, Scotchcal™ marking film (available from the Minnesota Mining and Manufacturing Company), were microembossed with polyimide tooling which was directly laser ablated with the inverse pattern corresponding to a 100 LPI pattern at 25, 35, and 50 micrometers depth (of the well). As a control, flat film was also printed upon. These varying depth cavities in PVC were then subjected to print tests on the Trident printer. The smearing of the inks were then examined immediately after printing, but before cure, using a cotton tipped swab with hard hand pressure.

The image on the flat film smeared easily upon rubbing the print. However, all the microembossed prints were not easily smeared. At 35 micrometers depth, the ink smear was almost not noticeable; at 50 micrometers depth, the ink could not be smeared immediately after printing.

bossed sample while they looked mottled and non-uniform on the smooth sample. The dry time was measured as before and the results are shown in Table 7 below. The Gardner Haze of the unimaged microembossed sample was 8.2 percent as determined by the method described in Example 1.

TABLE 7

Drytime: Reflective Print Density Measured 30 Seconds After Imaging

| Sample | Cyan | Mag | Yel | Red M | Y | Green C | Y | Blue M | C | Black |
|---|---|---|---|---|---|---|---|---|---|---|
| 75 LPI Radiation Cured Receptor | 0.36 | 0.26 | 0.16 | 0.21 | 0.2 | 0.18 | 0.14 | 0.22 | 0.34 | 0.06 |
| Control: smooth coating | 0.41 | 0.32 | 0.22 | 0.41 | 0.36 | 0.38 | 0.27 | 0.49 | 0.68 | 0.26 |

Example 7

Generating an Optically Transmissive Inkjet Receptor using Radiation Curable Materials A UV curable resin was prepared by adding 5 grams of hydroxyethyl acrylate (Aldrich Chemical Company, Milwaukee, Wis.), 0.15 gram of SR6 10 (Sartomer Company, Exton, Pa.), 0.19 gram of SR9035 (Sartomer Company, Exton, Pa.), and 0.16 gram of Darocur 1173 (Ciba Specialty Chemicals, Tarrytown, N.Y.) to 10 grams of a 50/50 solution of 10k molecular weight polyvinylpyrrolidone (Aldrich Chemical Company, and N-vinyl-2-pyrrolidone (Aldrich Chemical Company). A 75 LPI tool (Example 1) made of silicone ("SILASTIC J" two-part RTV silicone, obtained from Dow Corning Co, Midland, Mich.) was coated with the UV curable resin and a piece of MELINEX 617 (ICI of Wilmington, Del.) was laminated onto the resin coated tool using a hand ink roller to minimize the coating thickness. The resin was cured by irradiation through the MELINEX using a MetalBox medium pressure mercury lamp on its high setting at a speed of 11.3 m/min. After removing the cured resin/MELINEX film composite from the tool, the microembossed side was irradiated at 11.3 m/min beneath the mercury lamp.

A smooth resin-coated control was also produced using a knotch-bar coater set to make a 1.5 mil thick coating. The UV curable resin was cast between a sheet of plain 5 mil PET film (Minnesota Mining and Manufacturing Company) and a sheet of MELINEX 617. The resin was cured by irradiation through the MELINEX using a MetalBox medium pressure mercury lamp on its high setting at a speed of 11.3 n/min. The plain PET was then separated leaving the MELINEX film with a smooth resin coating.

The microembossed sample and the smooth sample were printed with cyan, magenta, yellow, red, green, blue, and black color blocks on a Hewlett-Packard Corporation HP 2500 desktop printer using "HP Premium Transparency" mode, "Best" quality, and "Automatic" color settings. The color blocks looked sharp and uniform on the microem- The invention is not limited to the above embodiments. The claims follow.

What is claimed is:

1. An inkjet printing medium comprising a polymeric sheet having an optically transparent microembossed surface topography comprising square cavities as one major surface thereof, wherein the microembossed polymeric sheet is nonporous and the cavities each have a volume of from about 1100 pL to about 5000 pL and the calculated percent non-planar area of the surface topography is 10 percent or less.

2. The inkjet printing medium of claim 1, herein the microembossed surface comprises a regular or random pattern over the area of the major surface.

3. The inkjet printing medium of claim 1, wherein cavities are enclosed by walls and packed closely together such that thickness of the wall tops is minimized.

4. The inkjet printing medium of claim 1, wherein the microembossed surface has a topography to protect printed material from abrasion from items contacting the microembossed surface, that on a macroscopic level constitutes the outermost surface of the medium.

5. The inkjet printing medium of claim 1, which has a Gardner Haze ranging from about 0 to about 20.

6. The inkjet printing medium of claim 5, wherein the volume of a cavity is at least about 1200 pL.

7. The inkjet printing medium of claim 5, wherein the volume of a cavity is less than about 5000 pL.

8. The inkjet printing medium of claim 1, wherein the sheet is clear or tinted, or combinations thereof.

9. The inkjet printing medium of claim 1, wherein the surface is made of a microembossed thermoplastic.

10. The inkjet printing medium of claim 1, wherein the sheet comprises one or more layers.

11. The inkjet printing medium of claim 1, wherein the sheet is a polymeric film selected from the group consisting of polyolefins, poly(vinyl chloride), copolymers of ethylene with vinyl acetate or vinyl alcohol, copolymers and terpolymers of hexafluoropropylene and surface modified versions thereof, poly(ethylene terephthalate) and copolymers thereof, polycarbonate, norbornene polymers and copolymers, polyurethanes, polyimides, acrylics, and filled versions thereof, wherein the filled versions employ fillers selected from the group consisting of silicates, aluminates, feldspar, talc, calcium carbonate, and titanium dioxide, or combinations thereof.

12. The inkjet printing medium of claim 1, further comprising an adhesive layer on a major surface opposite the microembossed surface.

13. The inkjet printing medium of claim 12, further comprising a release liner protecting the adhesive layer.

14. A inkjet printing medium comprising the inkjet printing medium of claim 1 and a material deposited on the microembossed surface.

15. The inkjet printing medium of claim 14, wherein the material is jettable.

16. The inkjet printing medium of claim 15, wherein the jettable material is selected from the group comprising inks, adhesives, biological fluids, pharmaceuticals, chemical assay reagents, particulate dispersions, waxes, electrically, thermally, or magnetically modifiable materials, and combinations thereof.

17. The inkjet printing medium of claim 15, wherein the jettable material is a pigmented ink.

18. The inkjet printing medium of claim 15, wherein the jettable material is a dye-based ink.

19. The inkjet printing medium of claim 15, wherein the jettable material is a pigmented inkjet ink.

20. The inkjet printing medium of claim 14, wherein the deposited material is deposited by means other than inkjet.

21. The inkjet printing medium of claim 19, wherein the pigmented ink comprises particles of pigment that reside in cavities of the microembossed surface.

22. An inkjet printing medium comprising a polymeric sheet having an optically transparent microembossed surface topography comprising cavities as one major surface thereof, wherein the microembossed polymeric sheet is nonporous and the cavities each have a volume of from about 1100 pL to about 5000 pL, the calculated percent non-planar area of the surface topography is 10 percent or less, and the microembossed polymeric sheet having a Gardner Haze ranging from about 0 to about 20 and a jettable pigmented inkjet ink deposited on the microembossed surface wherein the pigmented ink comprises particles of pigment that reside in the cavities of the microembossed surface.

* * * * *

UNITED STATES PATENT AND TRADEMARK OFFICE
CERTIFICATE OF CORRECTION

PATENT NO.  : 6,521,325 B1
DATED       : February 18, 2003
INVENTOR(S) : Engle, Lori P.

It is certified that error appears in the above-identified patent and that said Letters Patent is hereby corrected as shown below:

Column 5,
Line 46, insert -- . -- following "pL";
Line 46, insert new paragraph before "Random";

Column 10,
Line 59, delete "n/min", insert in place thereof -- m/min -- (both places);

Column 13,
Line 54, delete "PIXELET", insert in place thereof -- PIXELJET --;

Column 17,
Line 27, delete "(V)", insert in place thereof -- (Y) --;

Column 18,
Line 23, delete "if", insert in place thereof -- of --;
Line 23, delete "polyvinylpyrolidone", insert in place thereof -- polyvinylpyrrolidone --;
Line 25, delete "polyvinylalchohol", insert in place thereof -- polyvinylalcohol --;
Line 26, delete "g/ft2" and "g/m2", insert in place thereof -- $g/ft^2$ -- and -- $g/m^2$ --;

Column 19,
Line 34, delete "SR6 10". insert in place thereof -- SR610 --;
Line 60, delete "n/min.", insert in place thereof -- m/min. --;

Column 20,
Line 33, delete "herein", insert in place thereof -- wherein --;

UNITED STATES PATENT AND TRADEMARK OFFICE
CERTIFICATE OF CORRECTION

PATENT NO. : 6,521,325 B1
DATED : February 18, 2003
INVENTOR(S) : Engle, Lori P.

It is certified that error appears in the above-identified patent and that said Letters Patent is hereby corrected as shown below:

Column 21,
Line 6, delete "A", insert in place thereof -- An --before "inkjet".

Signed and Sealed this

Twenty-second Day of June, 2004

JON W. DUDAS
*Acting Director of the United States Patent and Trademark Office*